United States Patent [19]
Longenecker

[11] 3,912,967
[45] Oct. 14, 1975

[54] HEATER TEMPERATURE-REGULATING CIRCUIT FOR SENSOR OF HALOGEN LEAK DETECTOR

[75] Inventor: Daniel M. Longenecker, Waynesboro, Va.

[73] Assignee: General Electric Company, Schenectady, N.Y.

[22] Filed: Jan. 3, 1974

[21] Appl. No.: 430,391

[52] U.S. Cl. .................. 315/107; 315/309; 315/324
[51] Int. Cl.² ......................................... H05B 39/04
[58] Field of Search ........... 315/107, 116, 101, 275, 315/309; 219/497, 499

[56] References Cited
UNITED STATES PATENTS

| | | | |
|---|---|---|---|
| 3,299,346 | 1/1967 | Gambill | 219/499 X |
| 3,315,892 | 4/1967 | Haake | 219/497 X |
| 3,483,359 | 12/1969 | Hewlett, Jr. et al. | 219/497 |
| 3,789,190 | 1/1974 | Orosy et al. | 219/497 |
| 3,803,385 | 4/1974 | Sandorf | 219/497 X |

Primary Examiner—Nathan Kaufman
Attorney, Agent, or Firm—Vale P. Myles

[57] ABSTRACT

A circuit for energizing and regulating the temperature of a heater-anode of a gas sensor. The heater-anode is connected in one arm of a bridge circuit. A d-c voltage source is connected across one diagonal of the bridge through a transistor switch and the input of a temperature regulating circuit is connected across the other diagonal of the bridge circuit. The temperature regulating circuit closes the transistor switch when the heater-anode resistance is less than a desired value and opens the switch when the heater-anode resistance exceeds the desired value.

9 Claims, 2 Drawing Figures

HEATER TEMPERATURE-REGULATING CIRCUIT FOR SENSOR OF HALOGEN LEAK DETECTOR

BACKGROUND OF THE INVENTION

The present invention relates to a circuit for energizing the heater-anode of a gas sensor and in particular to a circuit for biasing and regulating the temperature of the heater-anode.

In certain applications it may be desirable or necessary to maintain an electrically heated device at a constant temperature as the temperature may control certain characteristics. For example, an electric lamp produces light output which is dependent upon the filament temperature. Also the color of light emitted from certain filaments depends upon the filament operating temperature. Such devices used as standards would require exact control of the filament temperature.

Temperature is an important factor in certain gas detectors such as halogen gas detectors and combustible gas detectors. Each of these devices requires a heating element to elevate its operating temperature into the range of 600° C. to 1200° C. While the devices are operative over the entire range, their sensitivities or other characteristics are dependent upon the particular operating temperature. Hence, it is necessary to control the temperature if the device is to be operated in a high sensitivity range or with good repeatability.

In one type of halogen leak detector the heater also acts as one of the electrodes of the gas sensor. The temperature of the gas sensor determines the amount of current (called the background current) that flows in the gas sensor in the absence of a halogen gas. The presence of a halogen gas causes a change in the current flowing in the gas sensor. In the most sensitive range, a change of 0.01 microamperes in the sensor output results in full scale deflection of the gas sensor indicating output. It is important to regulate the temperature of the gas sensor because a change in the temperature results in a change of the background current level which can be erroneously attributed to the presence of halogen gas.

A known circuit for energizing and regulating the temperature of a heating element is described in U.S. Pat. No. 3,483,359 — Hewlett and Roberts. In that circuit, the heater forms one arm of a bridge circuit. An a-c source is applied across one diagonal of the bridge through the parallel combination of a diode and a silicon controlled rectifier (SCR). The diode is poled so that positive half cycles of the a-c source are always coupled to the heater and the SCR is poled so that negative half cycles of the a-c source can be selectively coupled to the heater by controlling the SCR gate input. A control circuit is connected across the other diagonal of the bridge. When the heater resistance is less than the value that is equivalent to the desired temperature of the heater, the bridge will be unbalanced and the control circuit, sensing the unbalance, will allow the SCR to conduct during the next negative half cycle thereby increasing the heater current. When the heater resistance is at the value that is equivalent to the desired temperature, the control circuit will sense that the bridge is balanced and prevent the SCR from conducting during the succeeding negative half cycle of the a-c source. The circuit has limited temperature control as determined by the change in the gas sensor temperature that results from coupling, or not coupling, one negative half cycle of the a-c source to the heater. It has also been found that certain patterns of conduction of the negative half cycles of the a-c source result in an increased noise level in the sensor output.

It is, therefore, an object of this invention to provide an improved circuit for energizing the heater of a gas sensor.

It is another object of this invention to provide an improved regulator circuit for controlling the heater temperature of a gas sensor.

SUMMARY OF THE INVENTION

In accordance with one aspect of this invention, the heater-anode of a gas sensor is connected in one arm of a bridge circuit. A d-c voltage source is connected across one diagonal of the bridge through a transistor switch and the input of a temperature regulating circuit is connected across the other diagonal of the bridge. The temperature regulating circuit closes the transistor switch when the heater-anode resistance is less than a desired value and opens the switch when the heater-anode resistance exceeds the desired value. In another aspect of the invention, a d-c bias voltage is applied to each end of the heater-anode through a resistor which helps to reduce the noise level in the sensor output.

The regulating circuit of this invention provides better temperature regulation of the heater and has a lower noise level in the sensor output than does the Hewlett and Roberts circuit. The noise level of the sensor output was found to be further improved by applying the bias voltage to each end of the heater-anode through a resistor, rather than to just one end of the heater-anode. Another advantage of this regulator circuit is that the sensor output current is less sensitive to variations in the a-c line voltage. And yet another advantage of the regulator circuit of this invention is that about four times as much current flows through the heater-anode when the switch is closed than when the switch is opened (as compared to a ratio of two-to-one in the Hewlett and Roberts circuit) which means that the warmup time of the gas sensor is significantly reduced.

DESCRIPTION OF THE DRAWINGS

While the application concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION

Figure 1:
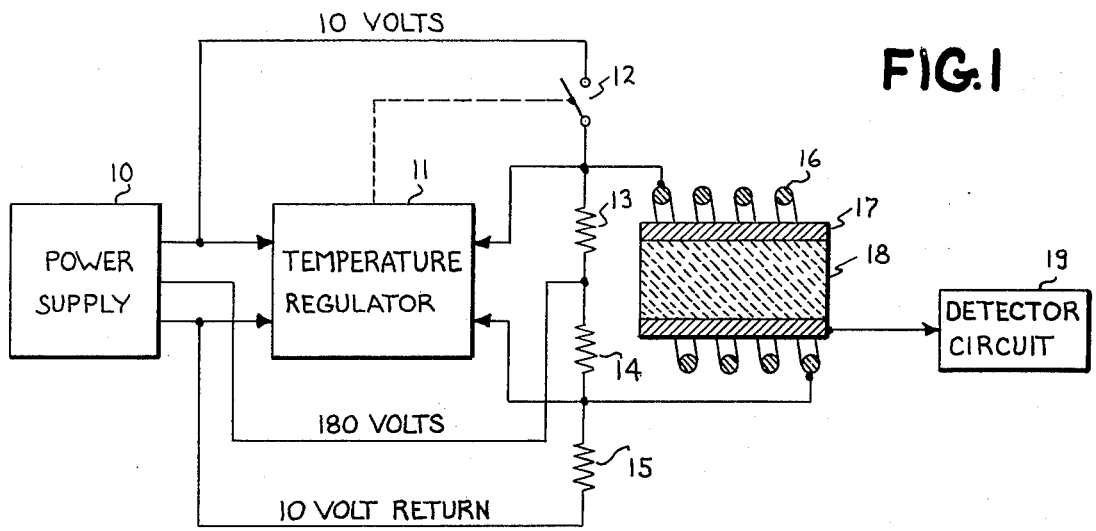
FIG. 1 is a block diagram, partially in pictorial form showing a device that utilizes the biasing and temperature regulation circuit of this invention.

FIG. 1 illustrates one application for a biasing and temperature regulation circuit in accordance with this invention. There is shown a gas sensor having an inner core 18, an electrode 17 wound about the inner core 18, a heater-anode coil 16 and a detector circuit 19 that measures the current flow between the heater-anode 16 and electrode 17. A power supply 10 having a 10 volt d-c output and a 180 volt d-c output energizes heater-anode 16. The 10 volt output is coupled to the heater-anode 16 through switch 12. Temperature regulation circuit 11 senses the voltage developed across the heater-anode 16 and a resistor 15 and operates switch 12 so as to maintain the heater-anode 16 at a predetermined temperature. The 180 volt output of power supply 10, coupled to one end of heater-anode through resistor 13 and to the other end of heater-anode 16 through resistor 14, provides a bias voltage to heater-anode 16. Examples of devices utilizing constructions or concepts such as that depicted in FIG. 1 are halogen and combustible gas leak detectors. In those applications it is desirable to accurately maintain the temperature of the heater-anode 16, the electrode 17 and the inner core 18.

Figure 2:
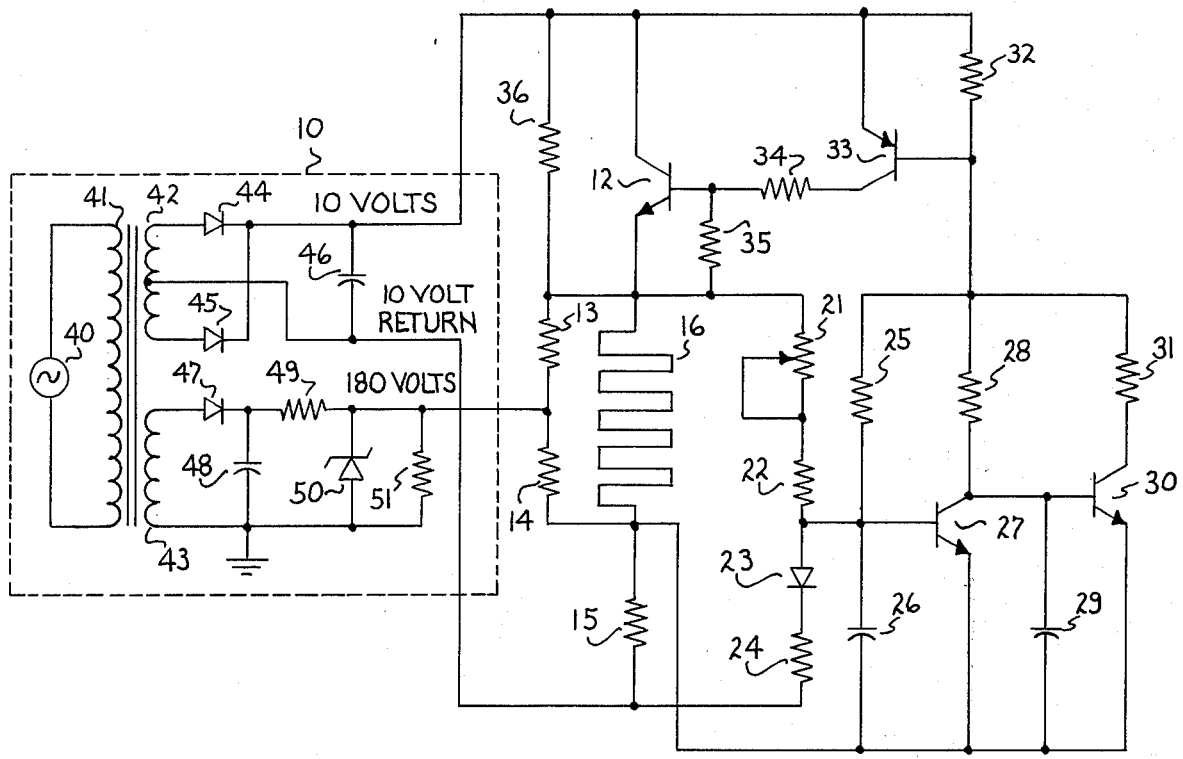
FIG. 2 is a schematic diagram of the biasing and temperature regulation circuit of this invention.

FIG. 2 is a detailed schematic diagram of the circuitry shown partially in block form in FIG. 1. An alternating current source 40 is applied to the primary 41 of a transformer. The output of a first secondary winding 42 of the transformer is rectified by diodes 44 and 45 to provide 10 volts d-c on capacitor 46. The output of a second secondary winding 43 is rectified by diode 47 to provide a d-c voltage on capacitor 48. The d-c voltage on capacitor 48 is applied to zener diode 50 through resistor 49 to establish the bias voltage level at 180 volts d-c.

The heater-anode 16 forms one arm of a bridge circuit, resistor 15 forms a second arm of the bridge, the series combination of resistor 22 and potentiometer 21 forms a third arm of the bridge and the series combination of diode 23 and resistor 24 forms the fourth arm of the bridge circuit. The d-c voltage stored on capacitor 46 is applied across one diagonal of the bridge through the parallel combination of resistor 36 and transistor switch 12. The other diagonal of the bridge is connected across the emitter-base circuit of transistor 27. When the temperature of the heater-anode 16 is less than the desired value, the emitter-base junction of transistor 27 will be back biased and transistor 27 will be non-conductive. When transistor 27 is non-conductive, current will flow from the 10 volt source through resistors 32 and 28 into the base of transistor 30 making transistor 30 conductive. When transistor 30 conducts, the current through resistor 31 will lower the potential at the base of transistor 33 allowing transistor 33 to become conductive. When transistor 33 conducts, current will be supplied through resistor 34 into the base of transistor switch 12, making transistor 12 conductive thereby causing increased current flow through the heater-anode 16.

When the temperature of the heater-anode 16 is at the desired temperature, the potential at the emitter of transistor 27 will have decreased so that transistor 27 conducts. When transistor 27 conducts, base current is prevented from flowing in transistor 30 and transistor 30 becomes non-conductive. When transistor 30 is non-conductive, current is prevented from flowing in the base of transistor 33 and transistor 33 becomes non-conductive. When transistor 33 is non-conductive, base current is prevented from flowing in transistor 12 and transistor 12 becomes non-conductive thereby limiting the current flowing through the heater-anode 16 to the amount supplied through resistor 36.

When the heater-anode 16 is first energized as by connecting the primary 41 of the transformer to the alternating current source 40, voltage will be applied to the bridge through resistor 36 and about 1.5 amperes will flow through heater-anode 16. Due to the voltage divider action of potentiometer 21, resistor 22, diode 23 and resistor 24, a reference voltage representative of the desired temperature of heater-anode 16, is generated at the base of transistor 27. Potentiometer 21 provides for adjustment of this reference voltage. Diode 23 compensates for changes due to temperature of the base-to-emitter voltage of transistor 27. When the heater-anode 16 is cold, the voltage divider action of heater-anode 16 and resistor 15 causes the potential at the emitter of transistor 27 to be very nearly equal to the voltage at the base of transistor 27 so that transistor 27 is non-conductive. As previously explained, this causes transistors 30 and 33 to be conductive which closes transistor switch 12 which causes about 6 amperes to flow through heater-anode 16. This high current level when the gas sensor is first energized helps to reduce the warm-up time of the sensor. If the heater-anode 16 has a positive temperature coefficient, the potential at the emitter of transistor 27 will decrease as the temperature of the heater-anode 16 increases until it reaches the point where transistor 27 becomes conductive. As previously explained, this causes transistors 27 and 30 to be non-conductive which opens transistor switch 12 causing the current through the heater-anode 16 to be reduced to 1.5 amperes.

Capacitors 26 and 29 prevent high frequency oscillation of the temperature regulation circuit while the value of resistor 25 is selected to improve the flatness of temperature regulation with changes in the 10 volt source.

Since the temperature regulating circuit of this invention can supply current to the heater-anode 16 for relatively short durations as compared to the Hewlett and Roberts circuit, the heater-anode temperature will be maintained more closely to the desired temperature.

Component values which operate with one embodiment of the biasing and regulating circuit herein described are as follows:

| 12 | Transistor | RCA 40251 |
| --- | --- | --- |
| 13 | Resistor | 1000 ohms |
| 14 | Resistor | 1000 ohms |
| 15 | Resistor | 0.4 ohms |
| 21 | Potentiometer | 500 ohms |
| 22 | Resistor | 750 ohms |
| 23 | Diode | 1N645 |
| 24 | Resistor | 464 ohms |
| 25 | Resistor | 100,000 ohms |
| 26 | Capacitor | 4.7 Microfarads |
| 27 | Transistor | 2N3391 |
| 28 | Resistor | 22,000 ohms |
| 29 | Capacitor | 0.01 Microfarads |
| 30 | Transistor | 2N3391 |
| 31 | Resistor | 470 ohms |
| 32 | Resistor | 1000 ohms |
| 33 | Transistor | D41D5 |
| 34 | Resistor | 5 ohms |
| 35 | Resistor | 100 ohms |
| 36 | Resistor | 5 ohms |

While the present invention has been described with reference to a specific embodiment thereof, it will be obvious to those skilled in the art that various changes and modifications may be made without departing from the invention in its broader aspects.

It is contemplated in the appended claims to cover all variations and modifications of the invention which come within the true spirit and scope of the invention.

What is claimed and desired to be secured by Letters Patent of the United States is:

1. A circuit for energizing and regulating the temperature of a heater-anode of a gas sensor comprising:

a. a d-c heating voltage source;

b. electronic switch means connected in series with the d-c voltage source and the heater-anode; and c. circuit means, connected in circuit with the heater-anode, responsive to the d-c voltage developed across the heater-anode for opening the switch whenever the heater-anode voltage increases above a predetermined value, d. said circuit means comprising a voltage divider network having a first resistor (32) connected in series with a parallel circuit including a second resistor (28) in series with a first transistor (27) in one leg of the parallel circuit and a third resistor (31) in series with a second transistor (30) in another leg of the parallel circuit, said first transistor being connected to bias the second transistor to a less conductive state in response to the heater anode voltage increasing above said predetermined value.

2. A circuit as recited in claim 1 wherein the gas sensor includes a second electrode and additionally comprising:

a. a d-c bias voltage source for biasing the heater-anode with respect to the second electrode;

b. a first resistor connected between the bias voltage source and one end of the heater-anode; and c. a second resistor connected between the bias voltage source and the other end of the heater-anode.

3. A circuit as recited in claim 1 additionally comprising a resistor in parallel, with the electronic switch means, for bypassing some current around the electronic switch.

4. A circuit for energizing and regulating the temperature of a heater-anode of a gas sensor element comprising:

(a) a bridge circuit including the heater-anode as one arm thereof;

(b) a d-c heating voltage source;

(c) electronic switch means connected in series with the d-c voltage source, said series combination being connected across one diagonal of the bridge; and (d) circuit means connected across the other diagonal of the bridge for closing the electronic switch when the resistance of the heater-anode is less than a predetermined value, (e) said circuit means comprising a first transistor (27) connected to said other diagonal and operable responsive to the resistance of said heater-anode being less than said predetermined value to cause a second transistor (30) and a third transistor (33) connected in circuit therewith to operate and thereby bias said electronic switch to its conducting state.

5. A circuit as recited in claim 4 wherein the gas sensor includes a second electrode and additionally comprising:

(a) a d-c bias voltage source for biasing the heater-anode with respect to the second electrode;

(b) a first resistor connected between the bias voltage source and one end of the heater-anode; and (c) a second resistor connected between the bias voltage source and the other end of the heater-anode.

6. A circuit as recited in claim 4 additionally comprising a resistor in parallel, with the electronic switch means, for bypassing some current around the electronic switch.

7. A circuit as recited in claim 4 wherein the circuit means includes a transistor having its base-emitter junction connected across the other diagonal of the bridge.

8. A circuit as recited in claim 5 additionally comprising a resistor in parallel, with the electronic switch means, for bypassing some current around the electronic switch.

9. A circuit as recited in claim 8 wherein the circuit means includes a transistor having its base-emitter junction connected across the other diagonal of the bridge.

* * * * *